Figure 1:
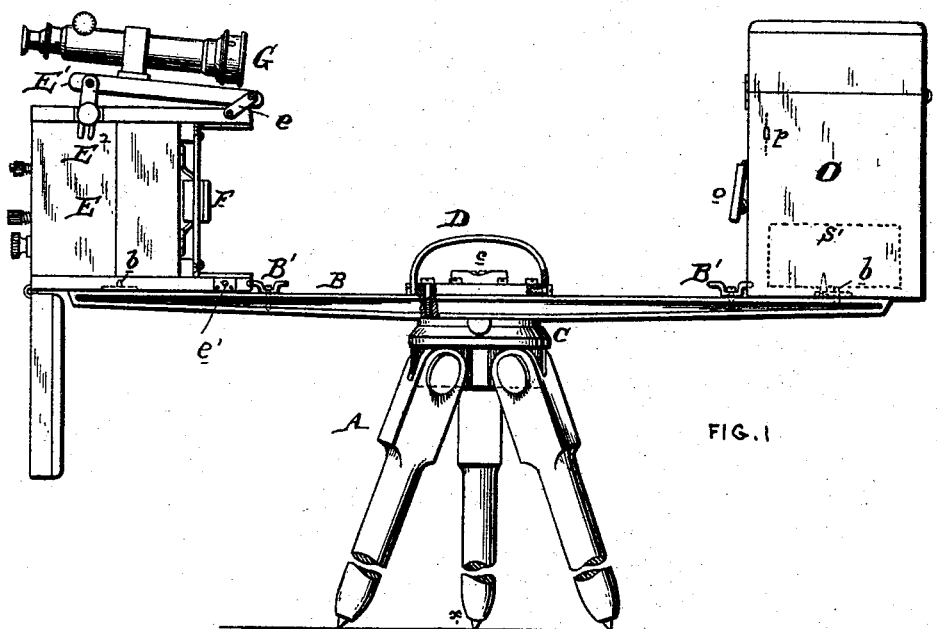

(No Model.) 2 Sheets—Sheet 1.

E. W. STEVENSON.
ELECTRICAL TESTING OUTFIT FOR CABLES, &c.

No. 496,801. Patented May 2, 1893.

WITNESSES:

INVENTOR:
Edw. Stevenson (No Model.) 2 Sheets—Sheet 2.
E. W. STEVENSON.
ELECTRICAL TESTING OUTFIT FOR CABLES, &c.
No. 496,801. Patented May 2, 1893.
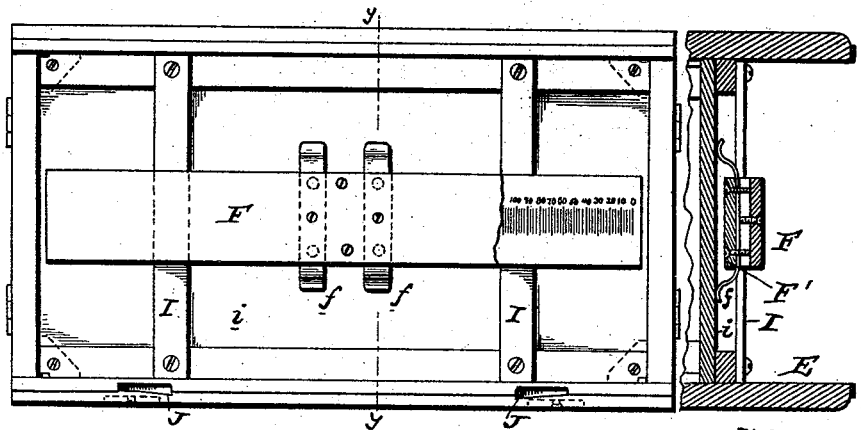
FIG. 5
FIG. 6
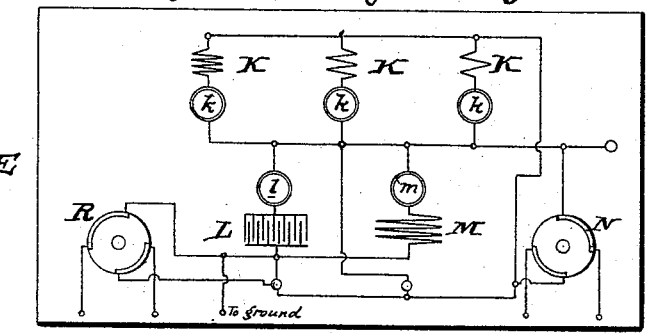
FIG. 7
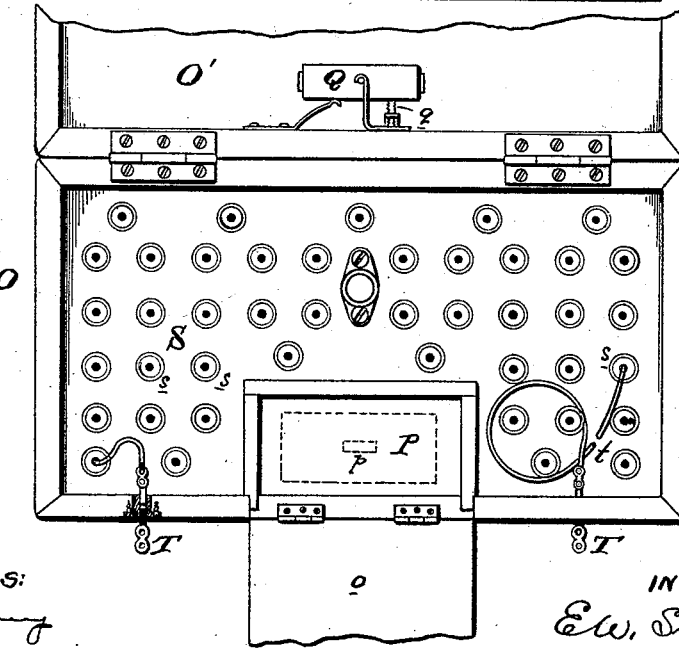
FIG. 8
WITNESSES:
INVENTOR:
E. W. Stevenson
By his atty

UNITED STATES PATENT OFFICE.

EDWARD W. STEVENSON, OF NEW YORK, N. Y., ASSIGNOR TO SAMUEL L. FOX AND EDWARD B. FOX, OF PHILADELPHIA, PENNSYLVANIA.

ELECTRICAL TESTING OUTFIT FOR CABLES, &c.

SPECIFICATION forming part of Letters Patent No. 496,801, dated May 2, 1893.

Application filed September 1, 1892. Serial No. 444,713. (No model.)

*To all whom it may concern:*

Be it known that I, EDWARD W. STEVENSON, of the city, county, and State of New York, have invented an Improvement in Electrical Testing-Outfits for Cables, &c., of which the following is a specification.

My invention has reference to electrical testing outfits for cables, &c., and consists of certain improvements which are fully set forth in the following specification and shown in the accompanying drawings which form a part thereof.

My improved apparatus is specially intended for measuring the insulation resistance and the electrostatic capacity of electrical conductors of all kinds whether located in buildings, in exposed conditions through the country or streets, located in the ground, or otherwise disposed of, and without regard to the purpose for which said conductors are to be used. Its most successful field is thought to be in measuring the insulation resistance and electrostatic capacity of underground electric light or power cables, the number of which is daily increasing at a rapid rate. As these cables are expensive to make and lay, and as large districts of cities often depend upon them for light and power, the loss which would be occasioned by a sudden and unexpected break down of the cables might be very great. It is therefore very necessary to test the cables accurately from time to time. Such cables are usually made to have different insulation resistance and electrostatic capacity according to the different purposes for which they are to be used. The manufacturer's test usually accompanies the cable, but as the cable has to be severely handled often in the difficult operation of laying it, and is thereby frequently subjected to severe strains, it is important to repeat the electrical tests immediately after the cable is laid to ascertain whether the cable is still sound and not weakened in the operation of laying it. If it were weakened in the operation of laying it, and its defect not detected, it is possible that the cable might give out when in operation and after being in short use and thereby cause a great deal of trouble and annoyance as well as loss. It is also important that these tests may be made at frequent intervals where the duties upon the cables are heavy or where there are causes which might tend to destroy the insulation, so that the slightest defect which may occur in the cable may be detected before it becomes too late to be taken care of by repairs or permit the cable being replaced by a new one. Some of the defects in the cable may occur through a gradual bending of the earth strata in which it is laid, through spontaneous chemical action of the constituent parts of the insulation compound with which the cable is surrounded, through chemical action by mineral and other agents in the soil upon the insulation, by lightning and other well known causes. Testing apparatus of this character necessarily comprises a number of separate devices, several of which are used at any one time. The complete outfit adapted to the various testing operations should include a scale, a telescope or lamp, a galvanometer, shunts, a standard resistance, a condenser, and a battery.

Heretofore in making tests of cables a large number of separate instruments had to be carried with great care and labor to the place where the test was to be made, and placed upon the ground or anywhere that was found convenient. On account of dust and moisture it was often impossible to use the apparatus when set up. As the various instruments were independent it was necessary to carry a large number of disconnected parts which it was required to properly couple together by suitable electrical conductors before they could be used. For instance, it was necessary to have a separate shunt or set of shunts by which the galvanometer deflection might be brought within convenient limits, a standard high resistance, a standard condenser, a battery, several keys, a telescope for observing the deflections, a suitable scale and other adjuncts.

The object of my invention is to condense all of these parts into a compact form, and so arrange the apparatus that it is portable and may be set up quickly and accurately and used anywhere just as readily as any surveying instrument. All of the details are so arranged that moisture and dirt cannot get into the essential parts and injure them.

In practice the whole apparatus is made very light and largely composed of aluminum to reduce the weight.

In carrying out my invention I employ essentially two boxes which are preferably detachably supported upon suitable legs such as the tripod, one of which boxes contains the shunts, standard resistance, condenser and telescope, while the other box contains the battery, and galvanometer. The two boxes may be provided with means to automatically couple them together so that they may be easily carried, while the support or tripod is detached and may also be carried in any convenient manner. In setting up the instrument the boxes are separated and attached at the two ends of the frame upon the tripod so as to be a short distance apart, and the whole apparatus is then leveled and quickly put into shape for work.

It is quite evident that the apparatus may be made with only a portion of the various devices specified where it is designed for only a portion of the tests, but for making any or all of the tests such as heretofore specified the boxes should be provided with the various parts mentioned.

The particular construction of the support and the means for leveling the apparatus is immaterial broadly considered, as there are numerous devices which could be used for properly supporting thereon both of the boxes in proper position above the ground.

The apparatus will be more fully understood by reference to the accompanying drawings, in which—

Figure 2:
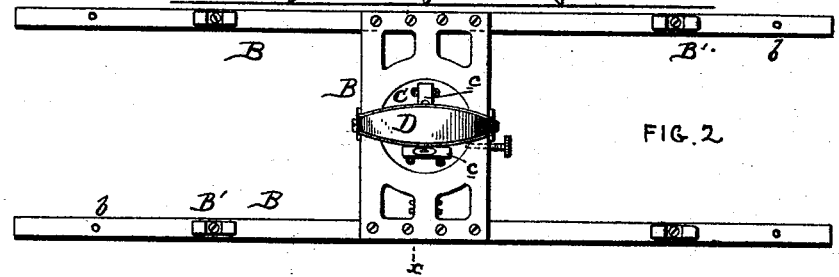
Figure 3:
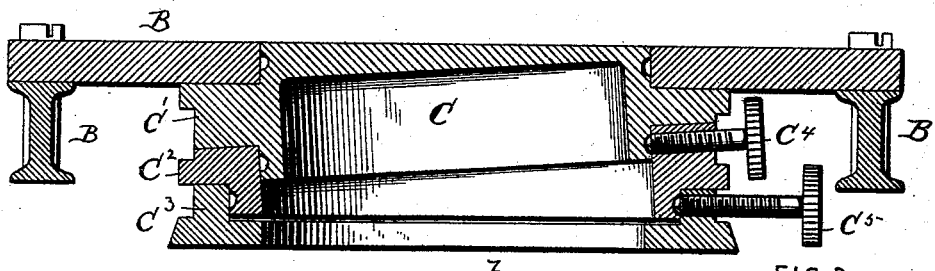
Figure 4:
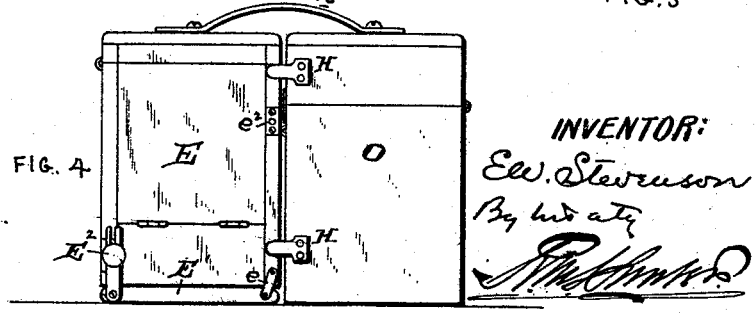

Figure 1 is a side elevation of the preferred form of my apparatus set up and ready for use except so far as the particular circuits are concerned. Fig. 2 is a plan view of the tripod and its table. Fig. 3 is a cross section of the tripod and leveling structure on line $x$—$x$ of Fig. 2. Fig. 4 is a side elevation showing the boxes in a detached condition for convenience in carrying. Fig. 5 is a rear view of the scale box shown in Fig. 1. Fig. 6 is a sectional elevation of a portion of same on line $y\ y$. Fig. 7 is a diagram which illustrates the arrangement of the shunts, resistance, condenser, and switches of the box containing the scale; and Fig. 8 is a plan view of the box containing the galvanometer, resistance and battery and is shown with the lid opened.

A is a tripod of any suitable construction. B is a frame or table suitably secured to the top of the tripod by means of a leveling joint C. This leveling joint is clearly shown in Fig. 3 and consists of the three parts $C'$, $C^2$ and $C^3$ fitting together with telescopic joints and having oblique bearings. Adjusting screws $C^4$ and $C^5$ enable the proper relative adjustment of the several parts $C'$, $C^2$ and $C^3$ to be made so that the table may be readily leveled without disturbing the tripod A after it has once been fixed in position. The table or frame B is supported upon universal or leveling joint C so as to have provision for movement about a vertical axis. The upper part of the tripod is provided with two support levels $c\ c$ arranged at right angles to each other so as to indicate when the table or frame B has been leveled. The frame may also have a handle D which may be made of metal and act as a protection to the support levels and also permit the frame to be readily carried after the boxes and tripod have been detached therefrom. The frame B is provided with pins or studs $b$ near its ends and also with clamps or turn buckles by means of which the boxes may be secured in place. The pins locate the boxes definitely in fixed positions upon the frame and therefore in definite positions relatively to each other.

The box O is provided on one side with a galvanometer P which contains a reflecting mirror $p$. This galvanometer is made exceedingly sensitive and may be of any suitable construction. The side of the box is provided with a small door $o$ which when opened exposes the galvanometer so that the mirror may be seen. The box is also provided with batteries $S'$ having a series of terminals $s$ in the face S so arranged with respect to the terminals T that a flexible conductor $t$ may be employed to put into circuit any number of the batteries desired. These batteries may be made in any suitable manner and of any desired number of cells to secure the proper electro motive force, and surround preferably three sides of the galvanometer as shown in Fig. 8.

$O'$ is the top of the box and may be turned backward so as to expose the terminals of the battery.

A regulating magnet Q may be employed to adjust the galvanometer for the purpose of bringing the mirror to a zero point when no current is flowing. The particular construction of this adjustable magnet forms no part of this application. The essential principle of it however is the pivoting of it in such a manner that it may be adjusted upon its pivots and also have its poles moved farther apart or brought nearer together so as to influence the galvanometer to the extent desired.

The box E is so arranged that when placed upon the table or frame B it is set upon its side. Its bottom $E'$ is hinged at $e$ so that it may be drawn up over the upper side of the box and is supported at an oblique angle by the adjustable clamp $E^2$. A telescope G is secured to this box. This telescope through an adjustable part $E'$ may be brought so as to focus upon the mirror $p$ of the galvanometer in the box O so as to receive the reflected rays of light leading from the adjustable scale F. By this means the scale F is seen in the telescope, and as the mirror vibrates, it will bring into view different portions of the scale and thereby indicate the extent of its vibration.

The adjustable scale is more clearly shown in Figs. 5 and 6. I I are two vertical bars secured a short distance from the bottom of the box bottom $i$. A bar $F'$ rests against the inner face of these bars I I. A scale F is secured to the bar F' and held just clear of the outer face of the said bars I. Springs $f$ are secured to the bar F' and press against the stationary bottom $i$ so as to hold the bar F' in frictional contact with the inner face of the bars or guides I. By this means the scale may be moved up or down, side wise or obliquely, or shifted in any suitable manner to secure the proper adjustment. It is evident that numerous arrangements may be employed to permit the proper adjustment of this scale. The lid of the box drops down as indicated in Fig. 1 and exposes the keys and plugs for controlling the standard resistance, shunts, and condenser.

Fig. 7 indicates, diagrammatically, the contents of this portion of the box E. K represents shunts of different resistances, either of which may be put in circuit by the plugs $k$. L is a standard condenser and may be put in circuit by the plug $l$. M is a standard high resistance and may be put in circuit by the plug $m$. R and N represent switches which may be employed for suitably coupling up the several parts or even cutting them out of circuit as desired. These various parts indicated in Fig. 7 may be of any suitable construction with respect to their minor details. The boxes are provided with holes to receive the pins $b$ and also with the oblique slots J (see Fig. 5) into which the turn buckles B' are turned to securely clamp the boxes in proper position upon the table or frame B. When the boxes are removed from the table they may be snapped together by suitable spring clamps H as shown in Fig. 4 and a leather or other handle $h$ may be attached to conveniently carry the boxes when attached.

It will be seen from the foregoing description that the instruments proper are supported at a considerable elevation above the ground so as to be clear of all dampness and dust, and are preferably supported within easy operating position for the operator so as not to strain him by stooping or otherwise, and the boxes are automatically locked in their proper relative positions by their adjustment to the common frame B. It is evident that the tripod structure might be duplicated having a tripod under or adjacent to each of the boxes so that each have their weight separately supported, but I prefer the construction wherein both boxes are secured upon a common tripod as being more compact, less bulky and permitting more ready and easy adjustment.

I will now refer briefly to some of the methods of making tests with such an instrument as herein described, though to some electricians this description will be unnecessary. The usual method depends upon the simplest application of Ohm's law wherein the current equals the electro motive force divided by the resistance. One terminal of the battery S' or other source of electro motive force is connected to one terminal of the galvanometer P; the other terminal of the galvanometer is connected to the conductor of the cable at any accessible point, the other end of the conductor being insulated. The outside of the cable, that is, its insulating covering, is connected to the ground to which is also connected the other battery terminal. In the case of the cable being laid underground the outside seating is usually assumed to be connected with the ground by direct contact. The cable being thus connected, the galvanometer deflection is noted. This gives a measure of the current. The cable is then removed and a known resistance as nearly as convenient equal to the supposed cable insulation resistance is put in its place and the galvanometer deflection again observed. The resistance employed is that found in the box E and marked M. From the second measurement a value is obtained of the amount of current which produces a given deflection of the galvanometer, and if the law of the galvanometer is known, the current which flowed through the cable will also be known in the first measurement. As we know the electro motive force and the resistance of the cable insulation, it is an easy matter to combine the two equations of the first and second measurements so as to eliminate the electro motive force, and the equation may be solved to ascertain the insulation resistance of the cable.

The electrostatic capacity of the cable may be measured by considering the conductor of the cable as one plate of a condenser and the ground with which the outside of the cable is connected as the other plate of the condenser. I then place one terminal of the battery S' in connection with the outside of the cable through the ground, and the other terminal is placed in connection with the conductor. The parts are left for a definite period of time in such relation. The battery is then suddenly removed from the circuit and the galvanometer P substituted for it. The cable will then discharge itself through the galvanometer, and its deflection may be read. I then take the standard condenser L and go through exactly the same operation substituting it for the cable. By comparison of the two galvanometer deflections, and knowing the capacity of the standard condenser, I may readily determine the capacity of the cable. The keys which are employed to control the circuits in making these tests are those marked N and R in Fig. 7 together with other portable keys, not shown and not forming any part of this special apparatus. These extra keys are placed in case E when not in use. This will give some idea of the various uses to which the apparatus may be put. The particular use of the apparatus of course may be varied as much as desired to accomplish any special tests.

It is evident that in place of the telescope G a lamp may be used in the well known manner for projecting its light upon the mirror and reflecting the beam of light upon the scale. The part marked G in Fig. 1 therefore might be considered either as a telescope or a lamp. The frame B and leveling head C may be formed of aluminum so as to reduce the weight to a minimum.

It is evident that the testing instruments need not be provided with all of the devices hereinbefore pointed out, for it might be made for the special purpose of making tests of only one or more kinds. Thus, the condenser might for instance be omitted, but in practice I prefer to employ all of the devices herein described so as to give a large field of usefulness to the apparatus. The additional weight resulting from the use of these various devices is not very great and would not materially increase the labor of carrying the parts.

It is quite evident that the battery might be dispensed with when a convenient current is at hand from any other source, and therefore broadly considered the battery is not essential, though some source of electrical energy to impart the necessary electro motive force must be employed. The use of an external source of electrical energy would be necessary if it were desired to measure a cable subjected to alternating currents as in that case the alternating current would have to be substituted for the battery of continuous current. The word battery therefore as employed in this specification is intended to cover any kind of battery and such connections as may be necessary to fit it for the particular purpose for which the test would have to be made.

While I prefer the general construction herein set out I do not limit myself to the details thereof as they may be modified in various ways without departing from the principles of my invention.

Having now described my invention, what I claim as new, and desire to secure by Letters Patent, is—

1. Electrical testing apparatus consisting of two independent testing boxes substantially of the nature herein set out, in combination with a frame to which the said boxes are detachably secured at a distance apart, and a tripod or portable support by which the frame is supported at a distance above the ground.

2. Electrical testing apparatus consisting of two independent testing boxes substantially of the nature herein set out, in combination with a frame to which the said boxes are detachably secured at a distance apart, a tripod or portable support by which the frame is supported at a distance above the ground, and a leveling joint between the tripod and frame whereby the latter may be readily leveled after the instrument is set up.

3. Electrical testing apparatus consisting of two independent testing boxes substantially of the nature herein set out, in combination with a frame to which the said boxes are detachably secured at a distance apart, a tripod or portable support by which the frame is supported at a distance above the ground, a leveling joint between the tripod and frame whereby the latter may be accurately leveled after the instrument is set up, and spirit levels carried above the tripod for the purpose of indicating when the frame is leveled.

4. Electrical testing apparatus consisting of two independent testing boxes substantially of the nature herein set out, in combination with a frame to which said boxes are detachably secured at a distance apart, a tripod or portable support by which the frame is supported at a distance above the ground, a leveling joint between the tripod and frame whereby the latter may be readily leveled after the instrument is set up, and a connection between the tripod or support proper and the frame whereby the latter may be moved about a vertical axis.

5. In a testing apparatus, the combination of a tripod or portable support, a frame supported thereon consisting of two longitudinal bars having a transverse portion at the center adjustably secured upon the tripod or support, and electrical testing instruments substantially of the nature herein set out secured upon the ends of said bars at opposite sides of the tripod or support in two sets, substantially as described.

6. In a testing apparatus, the combination of a tripod or portable support, a frame supported thereon consisting of two longitudinal bars having a transverse portion at the center adjustably secured upon the tripod or support by a universal leveling joint, and electrical testing instruments substantially of the nature herein set out secured upon the ends of said bars at opposite sides of the tripod support in two sets substantially as described.

7. In a testing apparatus, the combination of a portable support adapted to stand upon irregular ground, a frame carried by said support, and electrical testing instruments substantially of the nature herein set out detachably secured to said frame at a distance apart and having a fixed relation and adapted to be used in connection with each other in making tests in two sets, substantially as described.

8. In a testing apparatus, a support adapted to stand upon irregular ground, a frame carried by the support at a distance from the ground, testing instruments detachably secured to the frame at a distance from each other, and independent inclosing boxes for said instruments having means for detachably connecting them when removed from the frame whereby they may be readily carried as a unit.

9. In a testing apparatus, the combination of a support adapted to irregular ground, a frame carried by said support at a distance from the ground, a galvanometer secured at one end of the support, an adjustable scale and an adjustable telescope or lamp secured to the other end of the frame, and leveling devices for leveling the frame upon the support or stand, substantially as set out.

10. In a testing apparatus, the combination of a portable support adapted to irregular ground, a frame adjustably secured thereto, a box containing a galvanometer secured to one end of the frame and having an opening at one side to expose the mirror of the galvanometer, and a box secured to the other end of the frame and having its bottom adapted to open to support a telescope or lamp and to expose a scale to be used in connection with the galvanometer and having a removable cover so as to expose the vertical face opposite the scale upon which is located the switches and plugs necessary for controlling the circuits in testing.

11. As a new article of manufacture, a portable testing apparatus consisting of an adjustable support adapted to irregular ground, a frame adjustably secured upon said support, and two co-operative sets of electrical testing instruments for use in connection with the testing of cables for capacity or insulation carried by said frame, one at each end thereof and means to level said testing instruments without disturbing the support, substantially as set out.

12. Electrical testing apparatus consisting of two independent testing instruments substantially of the nature herein set out, in combination with a frame to which the said instruments are detachably secured at a distance apart, and a tripod or portable support by which the frame is supported at a distance above the ground.

13. Electrical testing apparatus consisting of two independent testing instruments substantially of the nature herein set out, in combination with a frame to which the said instruments are detachably secured at a distance apart, a tripod or portable support by which the frame is supported at a distance above the ground, and a leveling joint between the tripod and frame whereby the latter may be readily leveled after the apparatus is set up.

In testimony of which invention I have hereunto set my hand.

EDWARD W. STEVENSON.

Witnesses:
EDWARD M. LOCKE,
CHAS. W. SPEAR.